(12) United States Patent
Jiang et al.

(10) Patent No.: US 11,388,365 B2
(45) Date of Patent: Jul. 12, 2022

(54) VIDEO PROFILE CREATION SYSTEM

(71) Applicant: Microsoft Technology Licensing, LLC, Redmond, WA (US)

(72) Inventors: Yurong Jiang, Sunnyvale, CA (US); Federico Guillermo Hlawaczek, Mountain View, CA (US); Karthiek Chandrasekaran, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 16/916,409

(22) Filed: Jun. 30, 2020

(65) Prior Publication Data

US 2021/0409640 A1    Dec. 30, 2021

(51) Int. Cl.
*H04N 5/91*     (2006.01)
*G06N 3/04*     (2006.01)
*G06N 3/08*     (2006.01)

(52) U.S. Cl.
CPC ............ *H04N 5/91* (2013.01); *G06N 3/0445* (2013.01); *G06N 3/08* (2013.01)

(58) Field of Classification Search
CPC ...................................................... H04N 5/91
See application file for complete search history.

(56) References Cited

U.S. PATENT DOCUMENTS 11,139,083 B2 * 10/2021 Mellem ................. G16H 10/20
11,245,646 B1 *  2/2022 Koukoumidis ......... G10L 15/02

OTHER PUBLICATIONS

"Tensorflow/Models", Retrieved from: https://web.archive.org/web/20180925084400/https://github.com/tensorflow/models/tree/master/research/deeplab, Sep. 25, 2018, 12 Pages.

* cited by examiner

*Primary Examiner* — Daniel T Tekle
(74) *Attorney, Agent, or Firm* — Schwegman Lundberg & Woessner, P.A.

(57) ABSTRACT

Machine learning based method and system for video profile creation are described. The technical problem of permitting users to create professional quality video profile without requiring the expertise in using specialized video creation tools is addressed by a video profile creation system powered by machine learning methodologies. In one embodiment, the video profile creation system provides a guided video recording process, and also provides a video processing pipeline, where a recorded video is transformed into a professional-looking video profile.

20 Claims, 4 Drawing Sheets

VIDEO PROFILE CREATION SYSTEM

TECHNICAL FIELD

This application relates to the technical fields of software and/or hardware technology and, in one example embodiment, to video profile creation system.

BACKGROUND

An online connection network system is a web-based platform (e.g., a connection networking web site) that may be accessed by a user via a web browser or via a mobile application provided on a mobile phone, a tablet, etc. Each member registered with the online connection network may be represented by a user profile, which, in turn, may be represented by one or more web pages or a structured representation of the user's information in XML (Extensible Markup Language), JSON (JavaScript Object Notation) or similar format.

As an online connection network attracts users who wish to maintain their professional personal profiles, facilitating communication using multimedia tools is becoming increasingly important. An important aspect of nurturing contributors—users of the online connection network—is allowing them to show their value in their profiles. A user's profile web page may include various information such as, e.g., the name of a user, current and previous geographic location of a user, current and previous employment information of a user, information related to education of a user, information about professional accomplishments of a user, publications, patents, as well as information about the user's professional skills.

BRIEF DESCRIPTION OF DRAWINGS

Embodiments of the present invention are illustrated by way of example and not limitation in the figures of the accompanying drawings, in which like reference numbers indicate similar elements and in which.

OVERVIEW

Figure 1:
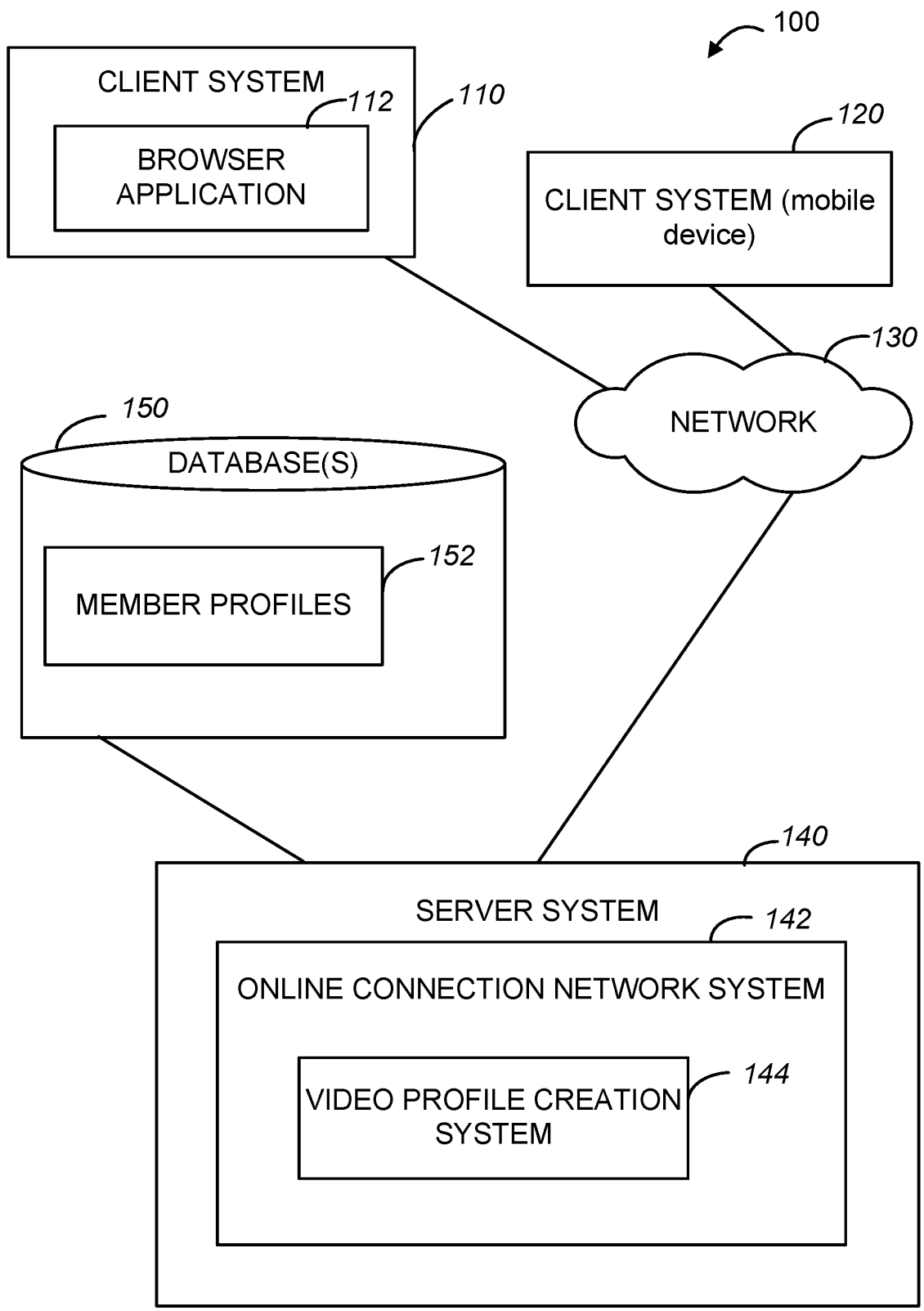
FIG. 1 is a diagrammatic representation of a network environment within which an example machine learning based method for video profile creation may be implemented.

A machine learning based method and system for video profile creation in online connection networks are described. In the following description, for purposes of explanation, numerous specific details are set forth in order to provide a thorough understanding of an embodiment of the present invention. It will be evident, however, to one skilled in the art that the present invention may be practiced without these specific details.

While it may be desirable to embed, in a profile web page of a user, a profile video that has a professional look and feel, both with respect to the content and the presentation, in which the user talks about themselves. The technical problem of automatically generating a description reflecting a user's characteristics included in their profile, automatically generating visual guidance for a user during recording of a video, and processing the recorded video to enhance its professional look and feel is addressed by providing a video profile creation system powered by artificial intelligence (AI).

In one embodiment, the video profile creation system provides a guided video recording process, where a user is guided through the recording process that results in a recorded video, and also provides a video processing pipeline, where a recorded video is transformed into a professional-looking video profile. In order to automatically generate a description reflecting a user's characteristics included in their profile, the video profile creation system integrates a machine learning powered script generator, which analyzes a user's profile information and generates the associated reading script. The video profile creation system may be configured to display a script window alongside the recording scene, the script window including the script, which is the text that the user can read out loud during the recording of their video. On both the video recording side and the video processing side, the video profile creation system employs machine learning methodology for assigning, to each pixel in the plurality of pixels, a label indicating whether it is associated with the image of a person in the frame or with the background in the frame. For the purposes of this description, the background in a frame is represented by pixels that are not part of the image of a person in the frame. The label indicating that a pixel is associated with the image of a person may be termed a person label (or a person pixel identifier). The label indicating that a pixel is associated with background may be termed a background label (or a background pixel identifier). This information about which area of a video frame displays a person and which area displays the background allows the video profile creation system to detect any shifts in position of the user in front of the camera during the video recording process and, in response, generate a warning message and surface the warning message on the user's display device in order to alert the user to that situation. It also allows the video profile creation system to replace the originally recorded background in the recorded video with a professional-looking background in the video processing pipeline. The training data for training the machine learning model is generated using profile images from the online connection network system. The training dataset may be generated in a human-assisted fashion with automation, where automatic segmentation detection for each image in a set of images, which identifies the position of a person in the image, followed by labeling the images and adjusting the image boundaries performed by a human operator.

The resulting video profile is embedded in the profile web page of the user in the online connection network system. Further details about a video profile creation system that offers a user-friendly solution to creating a professional video profile that can be presented on a profile page of a user of the online connection network system are described below.

DETAILED DESCRIPTION

An example video profile creation system may be implemented in the context of a network environment 100 illustrated in FIG. 1. As shown in FIG. 1, the network environment 100 may include client systems 110 and 120 and a server system 140. The client system 120 may be a mobile device, such as, e.g., a mobile phone or a tablet. The server system 140, in one example embodiment, may host an online connection network system 142. As explained above, each user of an online connection network is represented by a user profile that contains personal and professional information about the member and that may be associated with connection links that indicate the member's connection to other user profiles in the online connection network. User profiles and related information may be stored in a database 150 as user profiles 152.

The client systems 110 and 120 can access the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a video profile creation system 144. The video profile creation system 144 is configured to guide users in the process of recording a video profile and, also, to enhance the recorded video profile in order to create the look and feel of a professional studio environment.

The guided video recording process facilitated by the video profile creation system 144 includes features such as shot alignment, face departure warning, and an automatically generated reading script. Specifically, in some embodiments, the video profile creation system 144 provides a shot alignment guide that is overlaid on top of the video recording area. Some of the technical challengers associated with providing of the shot alignment guide are constructing the overlay with non-transparent pixels and eliminating the overlay for the recorded video prior to saving the recorded video. As is known, the RGB value for the black pixel is (0,0,0). (The RGB color model is a color model, in which red, green, and blue colors are combined in different proportions to produce a wide array of different colors.) Because the result of overlaying black pixels directly over the video would not be easily perceptible by a human eye, the video profile creation system 144, in creating the color for the shot alignment guide, uses the combines a black pixel with a brown color e.g., the color with the RGB value (165,42,42). The shot alignment guide is combined with the original video frame at a selected ratio, e.g., by applying a ratio of 0.4 over the original video frame.

In order to eliminate the overlaid pixels of the shot alignment guide for the recorded video prior to saving the recorded video, the video profile creation system 144 separates the operations of saving the original recorded video frames and the operations of displaying video frames with overlay. In some embodiments, the video profile creation system 144 is configured to permit users to choose a desirable position of the shot alignment guide.

In order to automatically detect any shifts of the position of the user's image on the recording screen, the video profile creation system 144 employs a lightweight face detector, which detects the face in real time and displays a warning message if a departure from the alignment relative to the overlaid shot alignment guide is detected. The lightweight face detector, in some embodiments, utilizes machine learning methodology, in which a machine learning model identifies, which pixels of a given video frame represent a person and which pixels of that video frame represent background. The machine learning model takes a plurality of pixels of a video frame as input and assigns, to each pixel in the plurality of pixels of the video frame, the person label or the background label. The person label (also referred to as a person pixel identifier) assigned to a pixel indicates that the pixel is associated with the image of a person in the video frame. The background label (also referred to as a background pixel identifier) assigned to a pixel indicates that the pixel is associated with background in the video frame. The machine learning model is trained using training data generated using profile images from the online connection network system 142. An example set of instructions for implementing a face departure monitor is shown below.

```
divertQueue=fixedFifoQueue
while frame=readframe( ):
    faceLoc=faceDetector(frame)
    d=dist(faceLoc, alignLoc)
    divertQueue.add(d)
    if avg(divertQueue)>THRESHOLD:
        raiseAlert( )
```

In some embodiments, the video profile creation system 144 integrates a machine learning powered professional script generator, which analyzes a user's profile information and generates the reading script, which is the text that the user can read out loud during the recording of their video profile. The reading script may be generated by retrieving various structured data from the user's profile, such as, e.g., professional title and work experience, education, certificates, publications, etc., and using this retrieved data as input into a machine learning model that acts like a text generator. The reading script may be presented of the user's display device alongside the recording screen. A machine learning model that is used to generate the script may be trained utilizing a training dataset generated by employing one or more human operators. The trained model takes, as input, information from a user's profile in the online connection network system (e.g., information related to the user's education, work experience, etc.) and information from one or more dictionaries maintained in the online connection network system (e.g., a standardized title dictionary that provides mapping from strings designating users' professional titles as they appear in their user profiles to standardized titles) and produces an output in the form of a reading script.

As explained above, a user's profile includes information such as, the name of a user, current and previous geographic location of a user, current and previous employment information of a user, information related to education of a user, information about professional accomplishments of a user, publications, patents, as well as information about the user's professional skills. The information in a user's profile is stored as values of different entity types and sub-entity types. For example, current and previous employment information of a user is stored as values of a company entity type (e.g., Company X) and as values of a position sub-entity type (e.g., a software engineer), while information related to education of a user is stored as values of a school entity type (e.g., University A) and as values of an academic degree sub-entity type (e.g., Ph.D.). A machine learning model that is used to generate a reading script based on a users' profile information stored in the online communication network system uses a recursive neural network (RNN) architecture that has the ability to use the output from a previous step to generate output of the present step, such as a previous sentence to determine a next word in a present sentence. In some embodiments, the RNN for generating text is long short term memory (LSTM) with dropout as a regularization technique to prevent over-fitting. For example, an LSTM may be configured to retain the output from a previous step as long as the input into the present step is of the same entity type as was the input into the previous step and to not retain (or "forget") the output from a previous step as if the input into the present step is of a different entity type from that of the input into the previous step.

As an illustration, a user's profile stored in the online communication network system may contain information indicating that the user's current position is senior software engineer at Company X, that the user's previous position was researcher at Company Y, that the user's academic degree is Ph.D. from University A, that the user's skills with respect to industry knowledge include machine learning and mathematical modeling, and that that the user's skills with respect to tools and technologies include Programming Language N. The machine learning model takes that information as input and produces the following script. "I'm currently a senior software engineer at Company X. Prior to working at Company X, I worked as a researcher at Company Y. I received a Doctor of Philosophy (Ph.D.) degree from University A. My areas of expertise are Machine Learning and Mathematical Modeling. I have expertise with programming in Programming Language N."

As stated above, the video profile creation studio 144, in addition to guiding users in the process of recording of a video profile, also provides a video processing pipeline to process a recorded video in order to enhance its professional look and feel. The video processing pipeline, in one embodiment, works as an asynchronous video processing engine. When the video profile creation system 144 detects completion of a recording session and an associated request to process the recorded video into a professional video profile, it uploads the recorded video and the associated metadata (e.g., time and location of the recording, etc.) to a storage location, from where it can be retrieved for processing. Once the processing job is finished, the output URL (Universal Resource Locator) referencing the resulting video profile is communicated to the client system of the user, so that the user can access and review the resulting video profile.

In the video processing pipeline, the recorded video is processed frame by frame. In order to ensure synchronization between audio and video portions of a given frame, the video processing pipeline is configured to demultiplex the recorded video into separate audio and video tracks and then process them separately. The processed video is first saved into the Audio Video Interleaved (AVI) format, and then transcoded to a preconfigured bitrate and resolution. To ensure the audio/video synchronization, the transcode process is configured to not drop frames or insert new frames.

In the video processing pipeline, the major steps in processing a recorded video include, first, detecting a person in the recorded video and creating pixel level masks a person mask of pixels representing a person and a background mask of pixels representing background. The pixel level masks are used to replace the originally recorded background in the recorded video with a professional-looking background. The process of creating using the pixel level masks is described further below. The second step is using optimized transcoding to improve video and audio quality, such as equalizing and leveling audio and applying color filters.

In order to enhance professional look and feel of a recorded video, the processing pipeline of the video profile creation system 144 replaces the originally recorded background in the recorded video with a professional-looking background. A professional-looking background is a previously stored image. In some embodiments, the video profile creation system stores a plurality of professional-looking background images and is configured to permit a user to select one of the stored background images. The process of replacing the originally recorded background in each frame of the recorded video with a different background is referred to as the overlay process. The overlay process, which results in producing frames overlaid with professional-looking background (overlaid frames), begins with detecting a person in the recorded video and creating respective pixel level masks for a person in the recorded video and for the associated background in the recorded video. The detecting of a person in a video is achieved by utilizing semantic segmentation methodology. Semantic segmentation of an image can be understood as image classification at a pixel level. It is a process, in which each pixel in an image (e.g., in a video frame, for the purposes of this description) is assigned a class label that indicates a particular class of an image, such as, e.g., a person, a building, a tree, etc. A pixel level mask for a person in a video frame is shown in Table 1 below, where "1" indicates a pixel representing a person and "0" indicates a pixel that represents information other than a person.

TABLE 1

[0, 0, 0, 0, . . . , 0
0, 0, 1, 1, 1, . . . , 0,
. . .
0, 0, 0, 0, . . . , 2]

A pixel level mask for the background in a video frame is shown in Table 2 below, where "1" indicates a pixel representing the background and "0" indicates a pixel representing a person. A pixel level mask for the background—the background mask—can be produced by inverting the pixel level mask for a person. For example, the pixel level mask shown in Table 2 was generated by inverting the pixel level mask shown in Table 1.

TABLE 2

[1, 1, 1, 1, . . . , 1
1, 1, 0, 0, 0, . . . , 1,
. . .
1, 1, 1, 1, . . . , 1]

In one example embodiment, a pixel level mask for a person in a video frame is generated using deep learning based approach for semantic image segmentation, by executing a machine learning model (e.g., deep convolutional neural networks) that takes a plurality of pixels of a video frame as input and generates, for each pixel in the plurality of pixels, the person label or the background label, where the generated labels, together, constitute the pixel level mask. The person label is assigned to a pixel indicates that the pixel is associated with the image of a person in the video frame, and the background label is assigned to a pixel indicates that the pixel is not associated with the image of a person and, as such, is associated with background in the video frame. The assigned labels can be stored as the pixel level mask for a person in a video frame, shown in Table 1 and as the pixel level mask for the background, shown in Table 2. A pixel level mask can be scaled back to the original video frame size to avoid quality degradation. The scale back is proportional to mask positions. For example, for the designed frame size (w, h), the mask point (x, y) in a frame (w', h') would be scaled to (x*w/w', y*h/h').

The result of the overlay process, the frames from the recorded video overlaid with professional-looking background—overlaid frames. The overlaid frames are produced by combining a dot-multiplication product of a recorded video frame and the pixel level mask for a person for the recorded video frame with a dot-multiplication product of a new background frame and the pixel level mask for the background for the recorded video frame. The new background frame comprises pixels of a professional-looking background.

Figure 2:
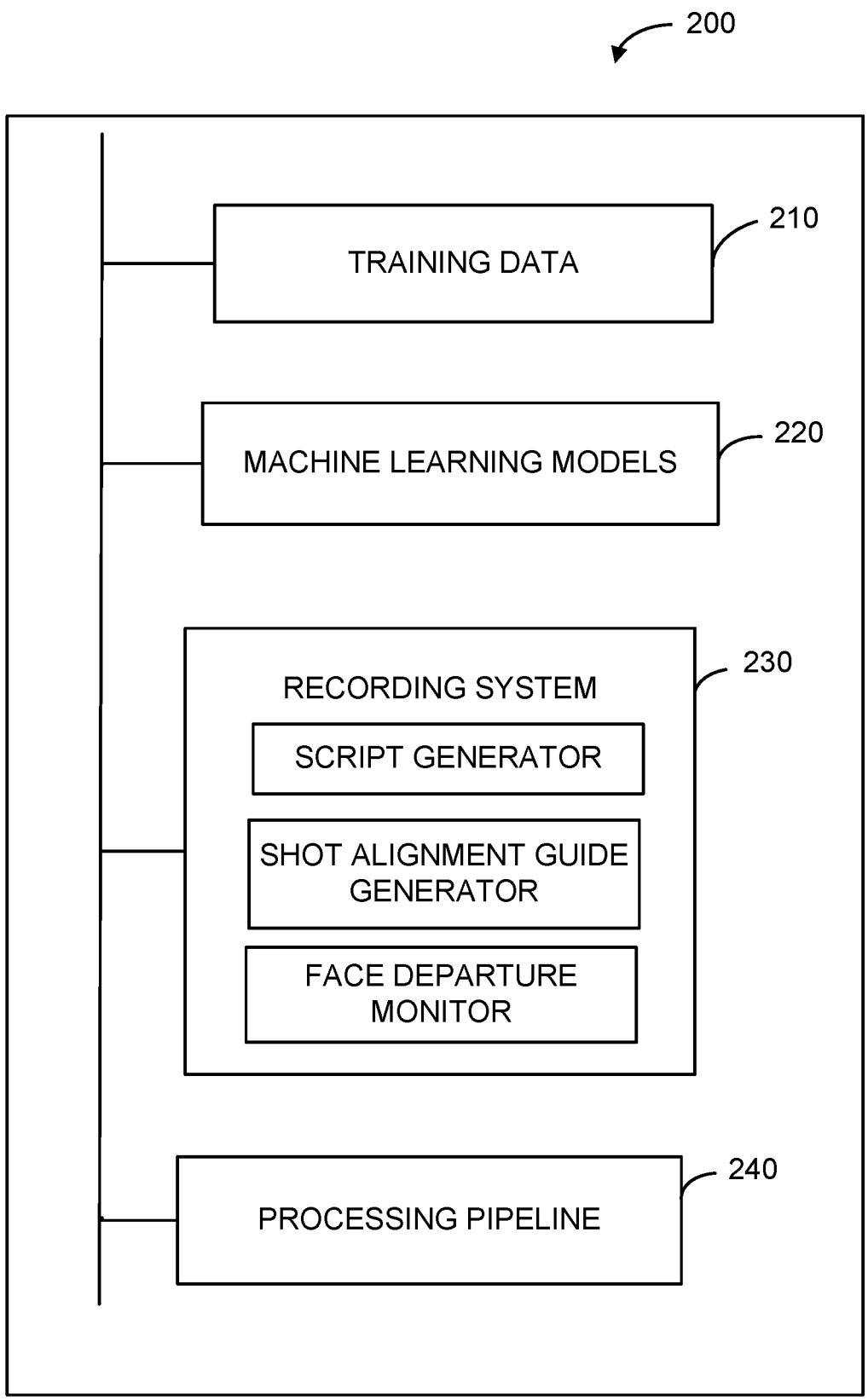
FIG. 2 is a block diagram of an architecture of a video profile creation system, in accordance with one example embodiment.

Example architecture of the video profile creation system 144 is illustrated in FIG. 2. FIG. 2 is a block diagram of an architecture 200 used by the video profile creation system 144 of FIG. 1. As shown in FIG. 2, the architecture 200 includes training data 210, a machine learning model 220, a recording system 230, and a processing pipeline 240. The training data 210 is used for training the machine learning model 220 using profile images from the online connection network system 142 of FIG. 1, as explained above. The machine learning model 220 takes a plurality of pixels of a video frame as input and assigns, to each pixel in the plurality of pixels, the person label or the background label, as explained above. The recording system 230 provides guided video recording experience to users of the online connection network system 142, where the guidance is achieved by utilizing a script generator that generates a reading script based on information from the user profile, a shot alignment guide generator that generates a shot alignment guide that is overlaid on top of the video recording, and a face departure monitor, as explained above. The processing pipeline 240 processes the recorded video to produce a professional quality video profile. Some operations performed by the video profile creation system 144 may be described with reference to FIG. 3.

Figure 3:
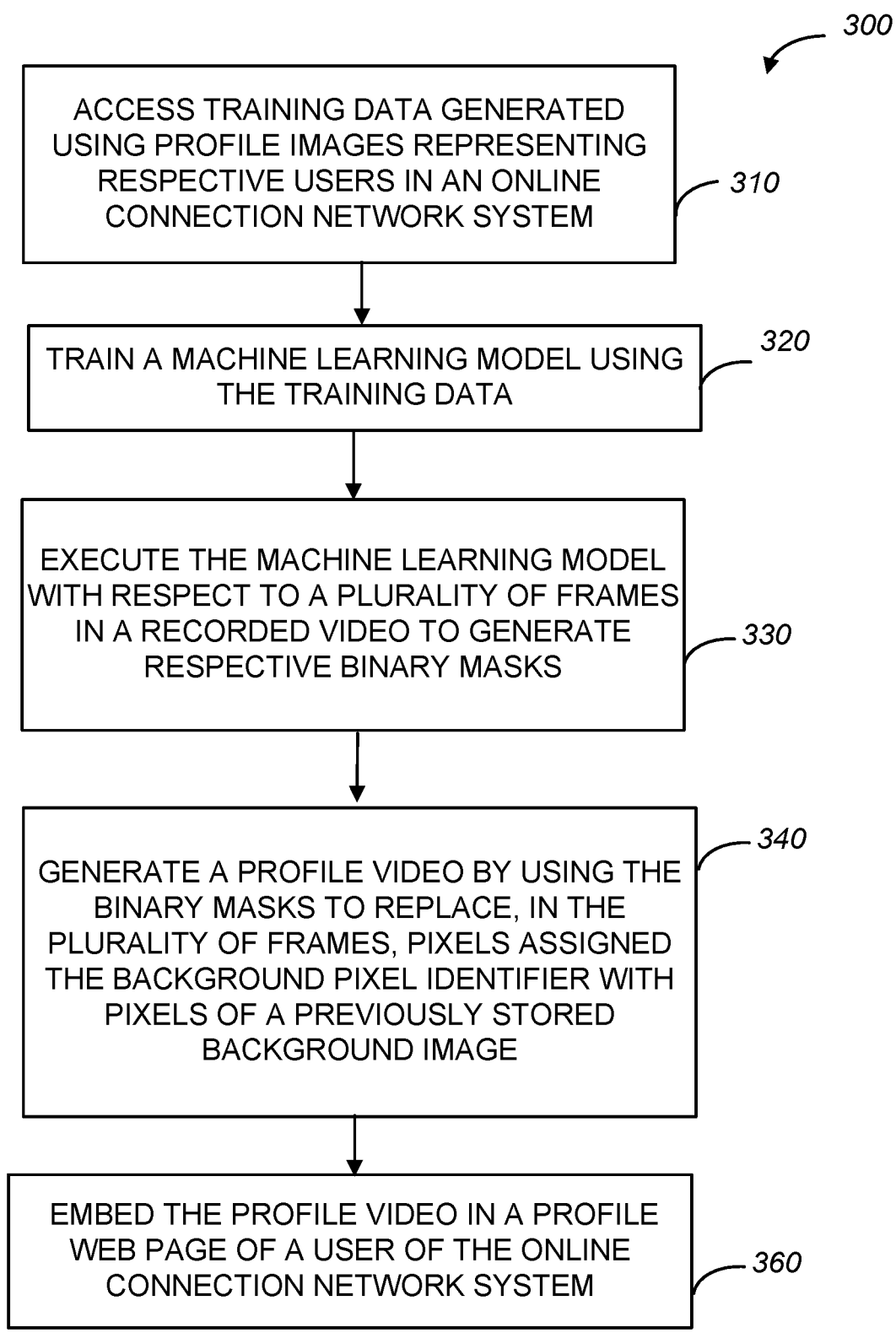
FIG. 3 is a flowchart illustrating video profile creation, in accordance with an example embodiment.

The method 300 described with reference to FIG. 3 may be performed by processing logic that may comprise hardware (e.g., dedicated logic, programmable logic, microcode, etc.), software, or a combination of both. In one example embodiment, the processing logic resides at the server system 140 of FIG. 1. As shown in FIG. 3, the method 300 commences at operation 310, by accessing the training data 210, which is generated using respective profile images representing users in the online connection network 142. At operation 320, the machine learning model 220 is trained using the training data. The machine learning model 220 takes a plurality of pixels as input and assigns, to each pixel in the plurality of pixels, the person label or the background label. At operation 320, the machine learning model 220 is executed with respect to a plurality of frames in a recorded video to generate, for frames in the plurality of frames, respective binary masks. A binary mask for a frame from the plurality of frames indicates pixels assigned the person label and pixels assigned the background pixel. At operation 320, a profile video is generated by using the respective binary masks to replace, in the plurality of frames, pixels assigned the background label with pixels of a previously stored background image. The operations 330 and 340 are performed by the processing pipeline 240. At operation 350, the profile video is embedded in a profile web page of the user of the online connection network system 142.

Figure 4:
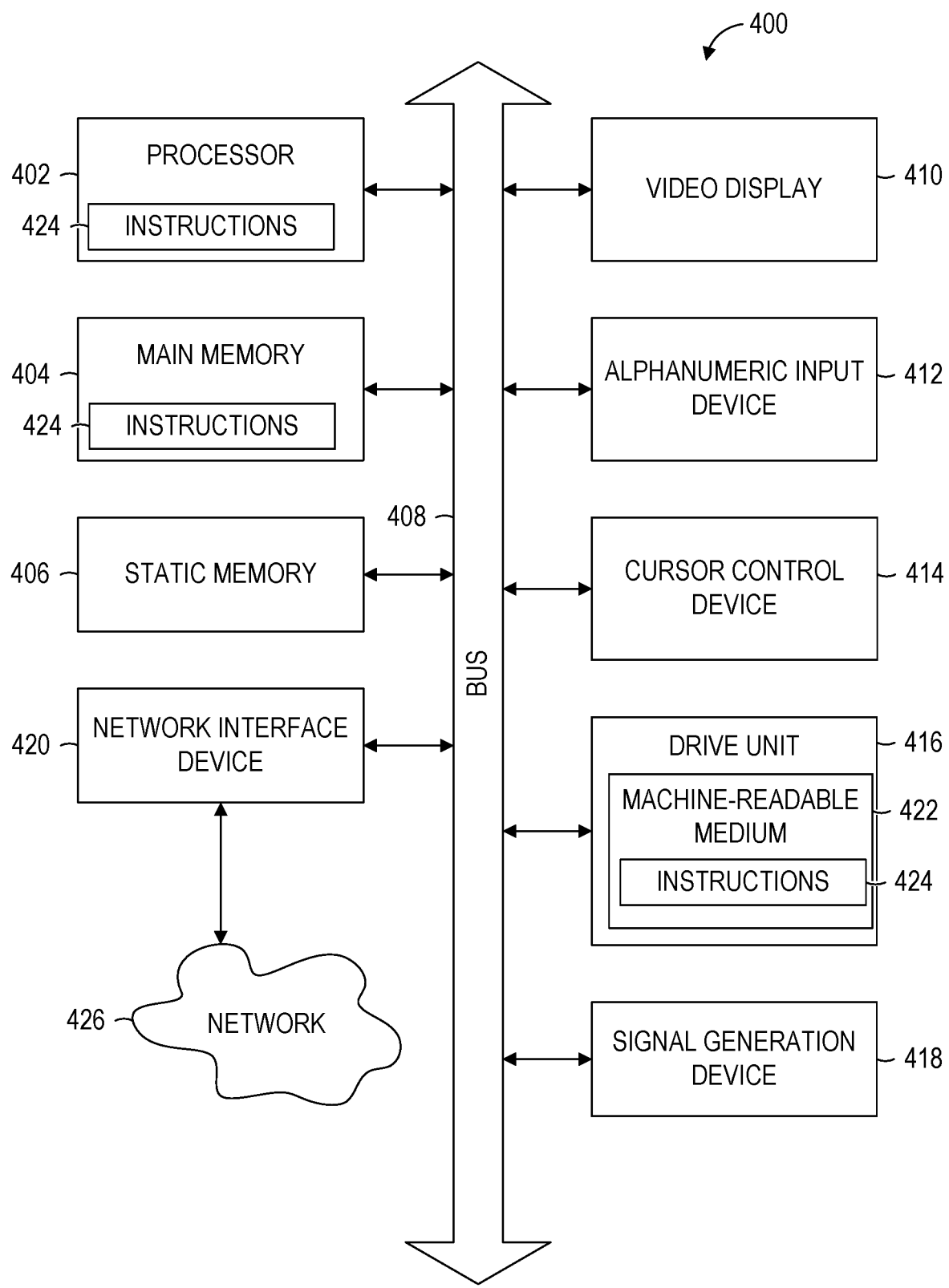
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

MODULES, COMPONENTS AND LOGIC

Certain embodiments are described herein as including logic or a number of components, modules, or mechanisms.

Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible thing, be that a thing that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a video profile creation system has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer implemented method comprising:
  maintaining a plurality of user profiles of respective users in an online connection network system, the plurality of user profiles comprising respective profile images representing the respective users;
  accessing training data, the training data generated using the respective profile images, each image in the training data including a first set of pixels having a person pixel identifier indicating that a pixel is associated with a depiction of a person and a second set of pixels having a background pixel identifier indicating that a pixel is associated with a depiction of a background;
  training a machine learning model using the training data, the machine learning model takes a plurality of pixels as input and assigns, to each pixel in the plurality of pixels, the person pixel identifier or the background pixel identifier;
  executing the machine learning model with respect to a plurality of frames in a recorded video to generate, for frames in the plurality of frames, respective binary masks, a binary mask for a frame from the plurality of frames indicating pixels assigned the person pixel identifier and pixels assigned the background pixel identifier;
  generating a profile video by using the respective binary masks to replace, in the plurality of frames, pixels assigned the background pixel identifier with pixels of a previously stored background image; and embedding the profile video in a profile web page of the user in the online connection network system.

2. The method of claim 1, further comprising generating a recorded video, the generating comprising:

receiving a request from the user, the request is to commence recording of a video; and in response to the request, facilitating recording process that result in the recorded video.

3. The method of claim 2, wherein the facilitating of the recording process comprises:

automatically generating a reading script comprising information from a user profile representing the user in the online connection network system by executing a machine learning model that uses long short term memory (LSTM) architecture, the machine learning model takes the information the user profile as input; and displaying the reading script on a display device.

4. The method of claim 2, further comprising, subsequent to the request to commence recording of the video, displaying a shot alignment guide that is overlaid on top of a video recording area.

5. The method of claim 4, further comprising, subsequent to the request to commence recording of the video:

detecting, in the video recording area, a departure of the set of pixels representing the user from the shot alignment guide; and in response to the detecting, displaying a warning message on a display device of the user.

6. The method of claim 5, wherein the detecting of a departure of the set of pixels representing the user from the shot alignment guide in the video recording area comprises executing the machine learning model.

7. The method of claim 1, wherein the generating of the profile video further comprises generating a background mask by inverting the binary mask for the video frame.

8. The method of claim 7, wherein the generating of the profile video further comprises scaling back combination of the background mask and the binary mask for the video frame.

9. The method of claim 8, wherein the generating of the profile video further comprises combining a dot-multiplication product of a recorded video frame from the recorded video and the binary mask for the recorded video frame with a dot-multiplication product of a new background frame and the background mask.

10. The method of claim 9, wherein the new background frame comprises a set of pixels of the previously stored background image.

11. A system comprising:

one or more processors; and a non-transitory computer readable storage medium comprising instructions that when executed by the one or processors cause the one or more processors to perform operations comprising:

maintaining a plurality of user profiles of respective users in an online connection network system, the plurality of user profiles comprising respective profile images representing the respective users;

accessing training data, the training data generated using the respective profile images, each image in the training data including a first set of pixels having a person pixel identifier indicating that a pixel is associated with a depiction of a person and a second set of pixels having a background pixel identifier indicating that a pixel is associated with a depiction of a background;

training a machine learning model using the training data, the machine learning model takes a plurality of pixels as input and assigns, to each pixel in the plurality of pixels, the person pixel identifier or the background pixel identifier;

executing the machine learning model with respect to a plurality of frames in a recorded video to generate, for frames in the plurality of frames, respective binary masks, a binary mask for a frame from the plurality of frames indicating pixels assigned the person pixel identifier and pixels assigned the background pixel identifier;

generating a profile video by using the respective binary masks to replace, in the plurality of frames, pixels assigned the background pixel identifier with pixels of a previously stored background image; and embedding the profile video in a profile web page of the user in the online connection network system.

12. The system of claim 11, further comprising generating a recorded video, the generating comprising:

receiving a request from the user, the request is to commence recording of a video; and in response to the request, facilitating recording process that result in the recorded video.

13. The system of claim 12, wherein the facilitating of the recording process comprises:

automatically generating a reading script comprising information from a user profile representing the user in the online connection network system by executing a machine learning model that uses long short term memory (LSTM) architecture, the machine learning model takes the information the user profile as input; and displaying the reading script on a display device.

14. The system of claim 12, further comprising, subsequent to the request to commence recording of the video, displaying a shot alignment guide that is overlaid on top of a video recording area.

15. The system of claim 14, further comprising, subsequent to the request to commence recording of the video:

detecting, in the video recording area, a departure of the set of pixels representing the user from the shot alignment guide; and in response to the detecting, displaying a warning message on a display device of the user.

16. The system of claim 15, wherein the detecting of a departure of the set of pixels representing the user from the shot alignment guide in the video recording area comprises executing the machine learning model.

17. The system of claim 11, wherein the generating of the profile video further comprises generating a background mask by inverting the binary mask for the video frame.

18. The system of claim 17, wherein the generating of the profile video further comprises scaling back combination of the background mask and the binary mask for the video frame.

19. The system of claim 18, wherein the generating of the profile video further comprises combining a dot-multiplication product of a recorded video frame from the recorded video and the binary mask for the recorded video frame with a dot-multiplication product of a new background frame and the background mask.

20. A machine-readable non-transitory storage medium having instruction data executable by a machine to cause the machine to perform operations comprising:

a non-transitory computer readable storage medium comprising instructions that when executed by the one or processors cause the one or more processors to perform operations comprising:

maintaining a plurality of user profiles of respective users in an online connection network system, the plurality of user profiles comprising respective profile images representing the respective users;

accessing training data, the training data generated using the respective profile images, each image in the training data including a first set of pixels having a person label indicating a person represented in the image and a second set of pixels having a background label indicating a background represented in the image;

training a machine learning model using the training data, the machine learning model takes a plurality of pixels as input and assigns, to each pixel in the plurality of pixels, the person label or the background label;

executing the machine learning model with respect to a plurality of frames in a recorded video to generate a binary mask indicating pixels that represent a user in the plurality of frames and pixels that represent background in the plurality of frames;

generating a profile video by using the binary mask to replace pixels that represent background in the plurality of frames with a previously stored background image; and embedding the profile video in a profile web page of the user in the online connection network system.

* * * * *